US011890705B2

(12) United States Patent
Wynn

(10) Patent No.: US 11,890,705 B2
(45) Date of Patent: Feb. 6, 2024

(54) WELD LOCATION DETECTION IN A BATTERY CELL PACK

(71) Applicant: Rivian IP Holdings, LLC, Plymouth, MI (US)

(72) Inventor: Nathaniel C. Wynn, Tustin, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 890 days.

(21) Appl. No.: 16/683,078

(22) Filed: Nov. 13, 2019

(65) Prior Publication Data

US 2020/0147714 A1    May 14, 2020

Related U.S. Application Data

(60) Provisional application No. 62/760,846, filed on Nov. 13, 2018.

(51) Int. Cl.
*B23K 9/095*    (2006.01)
*G06T 7/73*    (2017.01)
(Continued)

(52) U.S. Cl.
CPC ............ *B23K 9/0956* (2013.01); *B23K 9/007* (2013.01); *B23K 9/0953* (2013.01); *B23K 9/12* (2013.01); *G05B 19/402* (2013.01); *G06T 7/74* (2017.01); *H01M 10/0404* (2013.01); *H01M 50/50* (2021.01); *G05B 2219/45135* (2013.01);
(Continued)

(58) Field of Classification Search
None
See application file for complete search history.

(56) References Cited

U.S. PATENT DOCUMENTS 10,648,953 B1 * 5/2020 Lau ..................... B23K 20/10
10,847,775 B2 * 11/2020 Fees .................... H01M 50/213
(Continued)

FOREIGN PATENT DOCUMENTS

CN    103561896 A    2/2014
CN    112676676 A    4/2021
(Continued)

OTHER PUBLICATIONS

International Search Report and Written Opinion of PCT/US2019/061292 dated Apr. 17, 2020.

*Primary Examiner* — Stefan Gadomski
(74) *Attorney, Agent, or Firm* — Haley Guiliano LLP

(57) ABSTRACT

A frame is described for positioning a battery using a vision system to determine at least one weld point on the battery. The frame includes at least one visual reference feature detectable by the vision system. The reference feature is used by the vision system to determine the weld point(s). For example, the at least one visual reference feature includes a pair of stubs that define a line, and the at least one weld point is determined based on the line. In a further example, the pair of stubs correspond to respective batteries, which are arranged adjacent to one another within the frame. In a further example, respective centers of the stubs are lined up along a center line extending from respective centers of respective end faces of the respective batteries. The vision system includes vision circuitry, processing circuitry coupled to the vision circuitry, and a weld system.

20 Claims, 4 Drawing Sheets

(51) Int. Cl.
*B23K 9/007* (2006.01)
*B23K 9/12* (2006.01)
*G05B 19/402* (2006.01)
*H01M 10/04* (2006.01)
*H01M 50/50* (2021.01)
*H01M 50/213* (2021.01)
*H01M 50/516* (2021.01)

(52) U.S. Cl.
CPC . *G06T 2207/30108* (2013.01); *H01M 50/213* (2021.01); *H01M 50/516* (2021.01)

(56) References Cited

U.S. PATENT DOCUMENTS

| | | | | |
|---|---|---|---|---|
| 2004/0124227 | A1* | 7/2004 | Seki | H04N 5/35518 228/103 |
| 2005/0021170 | A1 | 1/2005 | Gustafsson et al. | |
| 2009/0104516 | A1* | 4/2009 | Yoshihara | H01M 50/503 429/149 |
| 2012/0070721 | A1* | 3/2012 | Han | H01M 50/538 429/163 |
| 2014/0096374 | A1* | 4/2014 | Syuto | H01M 50/264 29/730 |
| 2014/0115895 | A1 | 5/2014 | Herzinger et al. | |
| 2015/0375323 | A1* | 12/2015 | Becker | G09B 19/24 700/160 |
| 2015/0375324 | A1* | 12/2015 | Becker | G05B 9/02 700/212 |
| 2015/0379894 | A1* | 12/2015 | Becker | B23K 9/0956 219/137 R |
| 2016/0028059 | A1* | 1/2016 | Sweney | H01M 50/20 429/87 |
| 2016/0039034 | A1* | 2/2016 | Becker | B23K 9/322 219/136 |
| 2016/0039053 | A1* | 2/2016 | Becker | B23K 9/0956 228/8 |
| 2016/0104046 | A1* | 4/2016 | Doettling | G06T 7/0008 382/103 |
| 2016/0125592 | A1* | 5/2016 | Becker | B23K 37/006 348/90 |
| 2016/0125593 | A1* | 5/2016 | Becker | G06T 7/60 348/90 |
| 2016/0125594 | A1* | 5/2016 | Becker | B23K 9/32 315/246 |
| 2016/0125761 | A1* | 5/2016 | Becker | G09B 19/24 434/234 |
| 2016/0125762 | A1* | 5/2016 | Becker | B23K 9/0956 434/234 |
| 2016/0125763 | A1* | 5/2016 | Becker | B23K 9/126 434/234 |
| 2016/0125764 | A1* | 5/2016 | Becker | G09B 9/00 219/136 |
| 2016/0288236 | A1* | 10/2016 | Becker | B23K 9/0956 |
| 2017/0046974 | A1* | 2/2017 | Becker | G09B 19/003 |
| 2017/0046975 | A1* | 2/2017 | Becker | B23K 9/282 |
| 2017/0046976 | A1* | 2/2017 | Becker | B23K 9/282 |
| 2017/0046977 | A1* | 2/2017 | Becker | B23K 9/0956 |
| 2017/0291242 | A1* | 10/2017 | Benzing | B25J 5/005 |
| 2018/0053922 | A1* | 2/2018 | Van Roon | H01M 50/262 |
| 2018/0190960 | A1* | 7/2018 | Harris | H01M 50/503 |
| 2019/0296310 | A1* | 9/2019 | Newman | H01M 50/516 |
| 2019/0296321 | A1* | 9/2019 | Newman | H01M 50/296 |
| 2020/0168885 | A1* | 5/2020 | Lee | H01M 4/78 |

FOREIGN PATENT DOCUMENTS

| | | | |
|---|---|---|---|
| DE | 35 43 681 | 6/1987 | |
| DE | 102005042169 A1 | 3/2007 | |
| JP | 2001043839 A * | 2/2001 | ........... H01M 10/46 |
| JP | 2001-160383 A | 6/2001 | |
| JP | 2001-324449 A | 11/2001 | |
| JP | 2002-246003 | 8/2002 | |
| JP | 2005-005070 | 1/2005 | |
| JP | 2007-152374 A | 6/2007 | |
| JP | 2008-287993 A | 11/2008 | |
| JP | 2012-243514 A | 12/2012 | |
| JP | 2016-091607 A | 5/2016 | |
| JP | 2020-503652 A | 1/2020 | |
| KR | 101 697 698 | 1/2017 | |
| WO | 2018/126136 A1 | 7/2018 | |
| WO | WO-2018126136 A1 * | 7/2018 | .......... H01M 10/482 |

* cited by examiner

WELD LOCATION DETECTION IN A BATTERY CELL PACK

CROSS-REFERENCE TO RELATED APPLICATION

This application claims the benefit of U.S. Provisional Patent Application No. 62/760,846, filed Nov. 13, 2018, the disclosure of which is hereby incorporated by reference herein in its entirety.

The present disclosure is directed towards systems and methods for positioning battery cells for welding, and more particularly towards systems and methods for positioning battery cells for a vision system to determine a weld location.

SUMMARY

A typical vision system used in laser welding recognizes features on visible surfaces to locate weld spots. However, this is not suitable when the weld must target small features that are not visible—for example, the flat regions on the rim of a cylindrical battery cell (also referred to as a battery, herein), which are almost completely masked by a busbar, foil element, flex PCB, or current collector, to which said flat region will be welded.

In some embodiments, the present disclosure is directed to a frame for positioning a battery using a vision system to determine at least one weld point on the battery. The frame includes at least one visual reference feature detectable by the vision system. The reference feature is used by the vision system to determine the at least one weld point.

In some embodiments, the at least one visual reference feature includes a pair of stubs that define a line, and the at least one weld point is determined based on the line. In some embodiments, the pair of stubs correspond to respective batteries, which are arranged adjacent to one another within the frame. In some such embodiments, respective centers of the stubs are lined up along a center line extending from respective centers of respective end faces of the respective batteries.

In some embodiments, the frame includes at least one positional reference feature that respectively engages the battery for positioning the battery in a predetermined position. In some embodiments, the at least one positional reference feature includes at least one crush feature. In some embodiments, the frame includes a surface for that at least one battery to react against from the positional reference feature. In some embodiments, the frame includes at least an injection molded portion, and the at least one positional reference feature and the at least one visual reference feature are both exclusively located in either a core of the injection molded portion or in a cavity of the injection molded portion.

In some embodiments, the frame includes at least an injection molded portion.

In some embodiments, a battery of the at least one battery and an electrode are welded together at a weld point of the at least one weld point.

In some embodiments, the at least one battery includes a cylindrical battery.

In some embodiments, the frame includes a lead-in cone configured to receive and guide a battery of the at least one battery into place.

In some embodiments, the present disclosure is directed to a vision system. The vision system includes vision circuitry, processing circuitry, and welding equipment. The vision circuitry generates a vision signal that includes data indicative of the location of at least one reference feature in a frame, which is configured to position a battery. The processing circuitry is coupled to the vision circuitry and is configured to analyze the vision signal to determine at least one weld point, obscured to the vision circuitry, on the battery based on the at least one reference feature. The processing circuitry is also configured to generate a welding control signal based on the at least one weld point. The welding equipment is coupled to the processing circuitry, which communicates the welding control signal to the welding equipment causing it to perform a weld at the at least one weld point.

In some embodiments, the processing circuitry is configured to determine a location of a pair of stubs of the frame in the visual signal, interpolate a line that connects the pair of stubs, and determine the weld point based on the line.

In some embodiments, the processing circuitry is configured to determine the weld point to be along the line.

In some embodiments, the processing circuitry is configured to locate in the vision signal a point of contact of an outer surface of the battery with a horizontal wall of the frame, determine a center point of the battery based on the line and on a distance from the point of contact, trace a concentric arc based on the center point, and determine the weld point as being along the arc. The arc has a predetermined radius based on dimensions of the battery and intersects with the line.

In some embodiments, the distance is based on a nominal radius of the battery.

In some embodiments, the frame is configured to position a second battery, and there is no weld point on the second battery.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure relates to a feature set, and a method for the use thereof, which allow accurate location of the obscured rim (and flat section thereof) of a cylindrical battery cell. This disclosure applies to both single-cell and paired-cell rim weld architectures. In some embodiments, use of injection molded vision reference features are used to locate hidden tangency between an injection molded part of interest and a cylindrical battery cell, regardless of material condition (least, maximum, and all conditions between, per ASME Y14.5 GD&T definition) of the part, its features, and the battery cell.

In location-critical laser welding, an image of the assembly before any obscuring elements are added may be taken and analyzed for later use. However, it is possible to reduce the required camera count for the manufacturing facility, the number of assembly stages and buffers thereof, as well as other steps and components by using the camera that is needed in the laser welder regardless for purposes of identifying weld points. This provides module assembly line flexibility with potential cost reduction due to minimization of required imaging and image processing equipment. Reduction in cycle time may also be yielded as well as potential reduction in scrap rate.

In an injection molded part, regions controlled by the core will remain positioned accurately relative to other regions controlled by the core, with distance and feature size scaling closely with the overall shrinkage of the part. Similarly, regions controlled by the cavity will remain positioned accurately relative to other regions controlled by the cavity, with distance and feature size scaling closely with the overall shrinkage of the part.

As the separation between regions decreases, and as the feature size itself decreases, the relative variation from part to part will also decrease.

For parts manufactured by other processes, including machining, stamping, drawing, forging, coining, and others, features that are added in a single operation will also remain tightly controlled relative to themselves.

Further, if two arc sections of small radial variation are tangent through the same point, and have the same handedness, the distance between the end points at a given offset will be extremely small.

Figure 1:
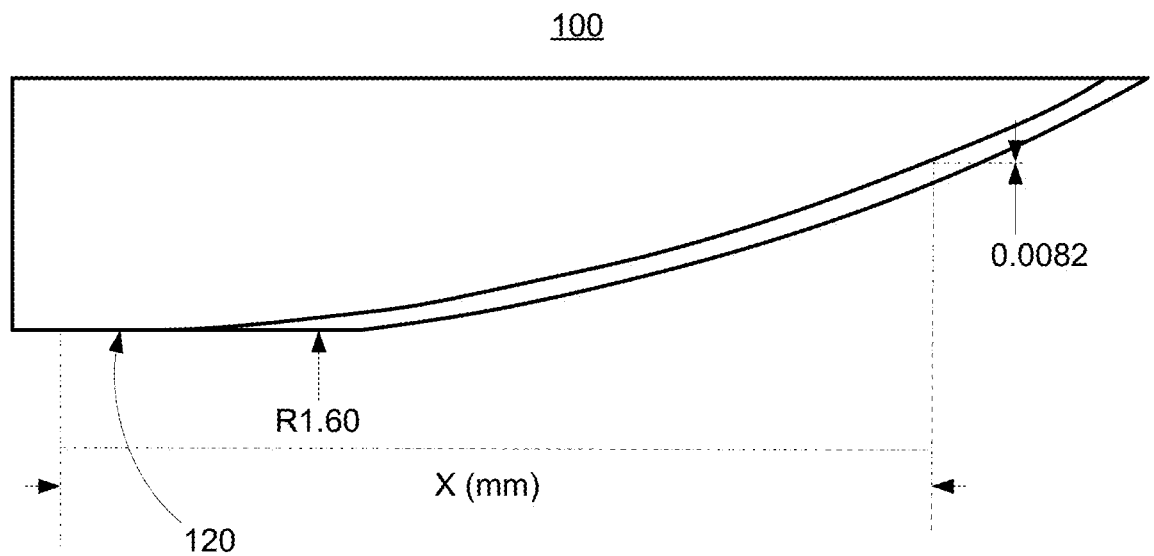
FIG. 1 illustrates an example variation in a pair of cylindrical battery cells, in accordance with some embodiments of the present disclosure.

FIG. 1 illustrates an example variation in a pair of cylindrical battery cells, in accordance with some embodiments of the present disclosure. As shown in this example, for two circles of diameter 20.9 mm and 21.1 mm that are mutually tangent, the distance between the points that project 4 mm along that tangency is approximately 0.0082 mm. At the 4 mm-from-centerline section that is visible with the collector tabs in place, the distance between the minimum cell diameter and maximum cell diameter is slightly less than 0.01 mm. This position will identify the location of the rim tangency (e.g., +/−0.05 mm from centerline between paired cells) within +/−0.005 mm. The position of rim flat 120 can be determined within +/−0.005 mm, plus the tolerance band of where rim flat 120 is relative to the rim diameter. For clarity, rim flat 120 refers to that portion of an end face of the battery cell that is substantially flat such that a component, such as an electrode, can be welded directly to the battery cell at that location. In some embodiments, rim flat 120 is located on the radially outward portion of the end face and extends circumferentially either entirely around or partially around the end face.

Presuming +/−0.1 mm position of rim flat 120 relative to diameter of the end face, 0.5 mm+/−0.05 mm width on the flat (centered), and a 0.2 mm wide weld bead (maximum, assumed), there may be a positional tolerance for the weld bead at +/−0.105 mm. In some embodiments, the weld bead maximum extent width may be 0.2 mm+0.105 mm=0.305 mm. Rim flat 120 minimum extent width, centered on the weld bead centerline, may be 0.5 mm-0.05 mm-0.1 mm=0.35 mm. Rim flat 120 minimum extent width is greater than the weld bead maximum extent width of 0.31 mm (rounded), about the same centerline. As such, the weld can be located such that its entirety is on rim flat 120.

Figure 2:
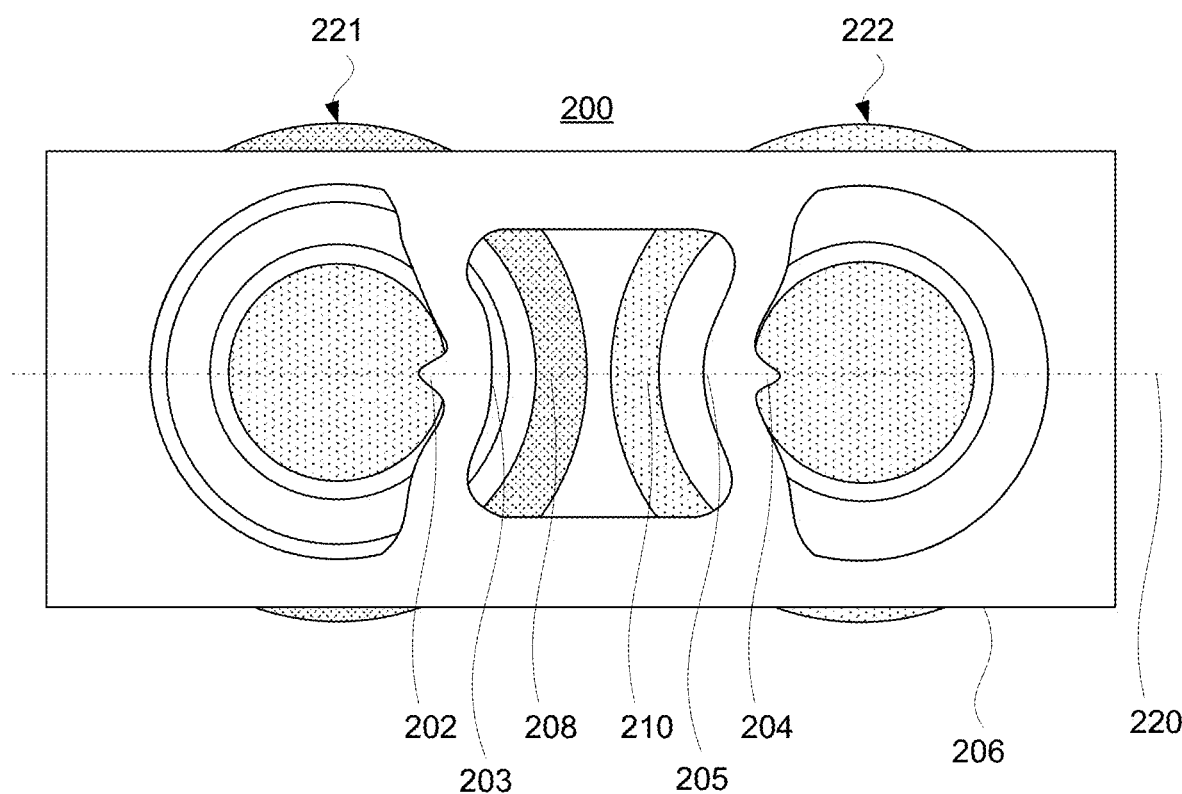
FIG. 2 shows a configuration that includes an illustrative frame that positions battery cells in, for example, a battery pack, in accordance with some embodiments of the present disclosure.

FIG. 2 shows a configuration that includes illustrative frame 206 that positions battery cells 221 and 222 (also referred to herein as batteries) in a battery pack, for example, in accordance with some embodiments of the present disclosure. Such a battery pack may be used in, for example, a vehicle such as an electric car. In some embodiments, frame 206 may be made of one or more components that are arranged on top of battery cells 221 and 222, on the bottom of battery cells 221 and 222, around one or more battery cells (e.g., battery cells 221 and 222), any other orientation with respect to one or more battery cells (e.g., battery cells 221 and 222), or any combination thereof. Frame 206 may be composed of any suitable materials, including, for example, a polymer (e.g., plastic), metal, rubber or latex, any other suitable material, or any combination of materials thereof. In some embodiments, frame 206 is or includes a plastic that is formed using any suitable injection molding process to manufacture the core and cavity.

In some embodiments, frame 206 holds one or more batteries in respective predetermined positions (e.g., as illustrated, battery cells 221 and 222 in an adjacent arrangement). Frame 206 may also be used to position any other suitable components in any suitable arrangement relative to each other, to battery cells 221 and 222, or a combination thereof. For example, frame 206 may be used to position a busbar, foil element, flex PCB, or current collector (not shown in FIG. 2).

Stubs 202 and 204 are provided in accordance with the present disclosure as visual reference features that a vision system may use to locate weld points. Weld points are locations at which the battery can be welded to any suitable other component, including, for example, any suitable busbar, foil element, flex PCB, or current collector.

Figure 3:
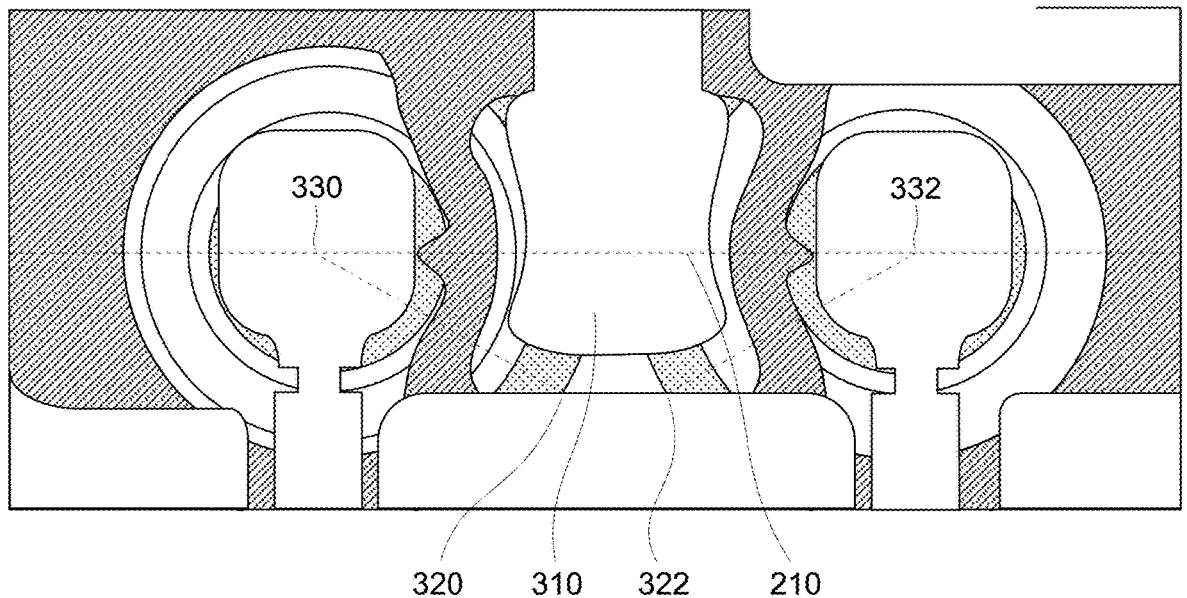
FIG. 3 shows a top view of the configuration of FIG. 2 along with other components that may prevent a vision system from directly observing or otherwise determining the location for an adequate weld point, in accordance with some embodiments of the present disclosure.

FIG. 3 shows a top view of the configuration of FIG. 2 along with other components that may prevent a vision system from directly observing or otherwise determining the location for an adequate weld point, in accordance with some embodiments of the present disclosure. For example, because the end face on which the weld point is intended is obscured with foil element 310, the vision system might not be able to identify obscured features or objects. For example, with reference to the unobscured illustration of FIG. 2, locations 208 and 210 may be desired locations (i.e., along respective rim flats of the batteries shown) to weld a busbar or current collector. However, because of the obstruction illustrated in FIG. 3, a vision system will be unable to directly locate positions 208 and 210.

The vision system of the present disclosure may, instead, rely on stubs 202 and 204 to identify locations 208 and 210 as weld points. The vision system relies on stubs 202 and 204, the centers of which may be arranged in-line with the centers of the batteries arranged within the frame. The vision system may interpolate a reference line (e.g., line 220) by connecting the centers of stubs 202 and 204. This line (line 220) will extend out and, at least within a particular tolerance, cross the centers of the battery cell end faces.

With reference to FIG. 3, the vision system detects the intersections of the visible portions of the battery cells with an appropriate horizontal reference (e.g., a wall or line). For example, the vision can detect intersections 320 and 322. The vision system then determines the points along line 220 that are a nominal-cell-radius (e.g., 10.5 mm for the illustrated battery cell) distant from those intersections. As illustrated, nominal cell centers 330 and 332 are determined to be points along line 220 that are a nominal cell-radius distant from respective intersections 320 and 322.

In some embodiments, other visual features of a frame can be used in accordance with the present disclosure to locate the nominal cell centers and thus weld points. For example, in some embodiments, arcs 203 and 205 of FIG. 2 may be used in place of stubs 202 and 204. The midpoints of arcs 203 and 205 are positioned along line 220 and thus can be used to determine this reference line. In this example, arcs 203 and 205 function as less pronounced stubs. As another example, arcs 203 and 205 may be shaped such that the center points of these arcs align with the nominal cell centers. In this example, it may not be necessary to find intersections 320 and 322 in order to find the nominal cell centers. Instead, the shape of an arc is detected and the corresponding center point is determined. In some embodiments, stubs 202 and 204 are not included in frame 206 and instead the corresponding edges comprise arcs similar to arcs 203 and 205. In some embodiments, the midpoints of these arcs are positioned along line 220 and the center points of these arcs are aligned with the nominal cell centers. In some embodiments, two, three, or all four arcs are used to determine the nominal cell centers.

Using a newly determined nominal cell center, the vision system then traces the curve of the nominal middle of the rim flat section of the battery cell (e.g., 9 mm for the illustrated battery cell). It will be understood that tracing includes determining the location of the trace. It will also be understood that the precise center of the battery cell is not necessary because there exists a tolerance band (e.g., on the order of 0.5 mm) larger than the rim flat position error (based on cell size as above, on the order of 0.01 mm) and the rim flat position error (separately based on cell size, on the order of 0.1 mm). The vision system may therefore determine the weld points for the two illustrated battery cells along their respective rim flats by determining, for example, where the rim flat curve intersects with the line connecting stubs 202 and 204.

It will be understood that, while stubs are illustrated in the particular geometry and shape as shown in FIGS. 2 and 3, that any other suitable geometry and shape can be used without departing from the scope of the present disclosure.

To help ensure the battery cell center is in-line with the weld fiducial surfaces discussed above, the frame may be arranged such that the battery cell enters its cup in a repeatable fashion. For example, each battery cell cup of the frame is partially formed of a lead-in cone, the intersections of which naturally form lead-in features. The (e.g., 21 mm diameter nominal) battery cell may need to be placed within an approximately 24 mm diameter circle in order to properly fall into place. In some embodiments, positional reference features may be included in the frame to help position the battery cell within the frame. For example, two balanced centering features may be used. These may be, for example, a spring or crush ribs that ensures the battery cells are constrained before the fixing adhesive is cured.

Figure 4:
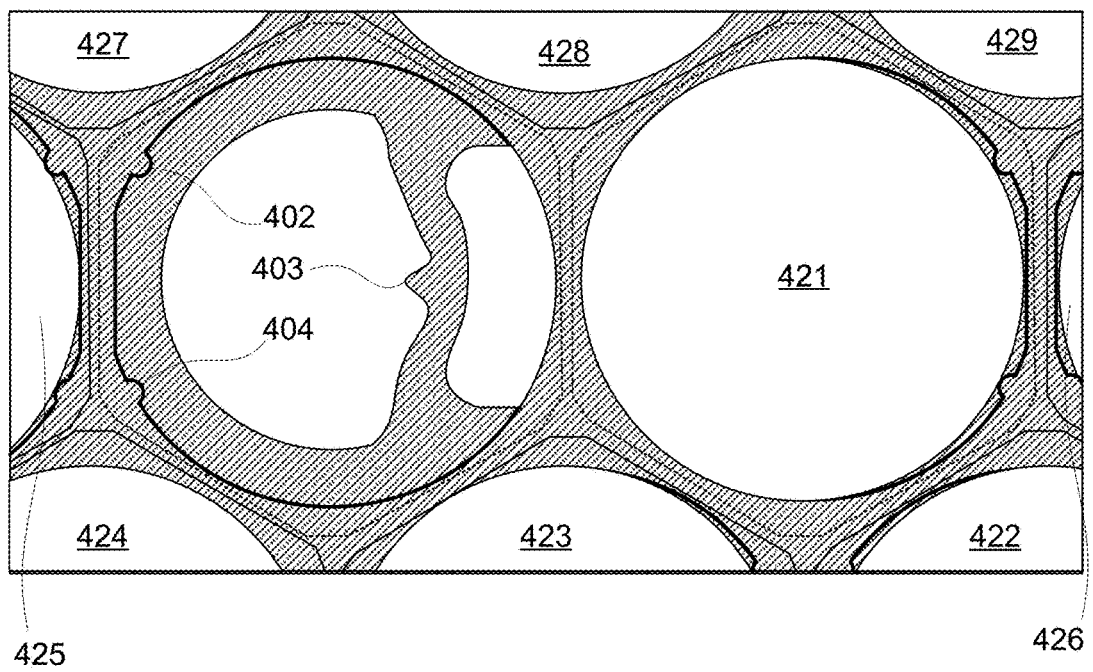
FIG. 4 shows a bottom view of an illustrative frame having crush ribs, with some battery cells arranged in place, in accordance with some embodiments of the present disclosure.

FIG. 4 shows a bottom view of illustrative frame 400 having crush ribs 402 and 404, with battery cells 421-429 arranged in place, in accordance with some embodiments of the present disclosure. In some embodiments, the frame includes respective surfaces with which each battery cell reacts against from the centering features, which will not itself deflect the battery cell away from the fiducial line. For example, this surface may be a flat wall in the frame. In some embodiments, when the frame is injected molded (or at least partially injected molded), the positional reference features (crush ribs 402 and 404) and vision reference features are either all in the core, or all in the cavity. As illustrated, they are all in the core.

Figure 5:
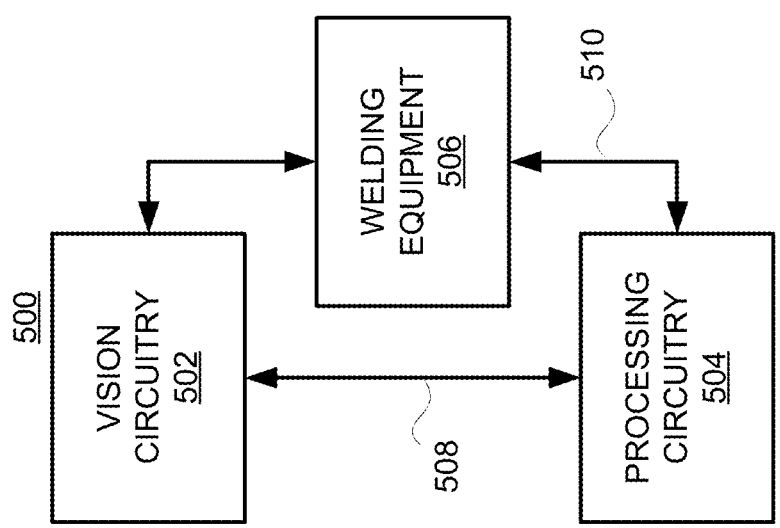
FIG. 5 shows an illustrative vision system, in accordance with some embodiments of the present disclosure.

FIG. 5 shows illustrative vision system 500, in accordance with some embodiments of the present disclosure. Vision circuitry 502 includes any suitable software, hardware, or both for generating vision signal 508. Vision signal 508 includes, for example, information indicative of the location of any suitable components such as those described above. For example, vision signal 508 includes information indicative of the location of any suitable reference position features, points of intersection between a battery cell and a frame, geometric features, visible features or patterns, any other suitable visual or otherwise optical feature, or any combination thereof.

Vision circuitry 502 may include one or more sensors, imaging equipment such as image sensors (e.g., photodetectors or cameras for detecting visible light or any other suitable photonic signal), lidar equipment, proximity sensors, doppler-based equipment, any other suitable sensor or imaging equipment, or any combination thereof.

Processing circuitry 504 includes any suitable software, hardware, or both for processing vision signal 508 in order to generate welding control signal 510. Welding control signal 510 is communicated to welding equipment 506, using any suitable hardware and communications protocol (e.g., wired, wireless, or optical communication). Processing circuitry 504 includes, for example, one or more computing devices having one or more processors capable of executing instructions based on inputs. For example, processing circuitry 504 may include a computer, mobile/tablet computing device, an embedded system, any other suitable computing device, or any combination thereof having instructions programmed thereon for processing vision signal 508 in order determine where weld points on a battery cell should be located. Such processing may include any suitable computer vision techniques, for example.

Welding equipment 506 includes any suitable hardware, software, or both for performing welding operations in response to, and in accordance with, welding control signal 510. For example, welding equipment 506 may include metal welding equipment, equipment for applying and curing an adhesive, laser welding equipment, any other suitable welding equipment, or any combination thereof. Vision circuitry 502 may provide information directly to welding equipment 506 to allow welding equipment 506 to, for example refine locations for placement of welds. Welding equipment 506 may include any suitable automated movement/robotic equipment for moving appropriate devices to make desired welds.

Figure 6:
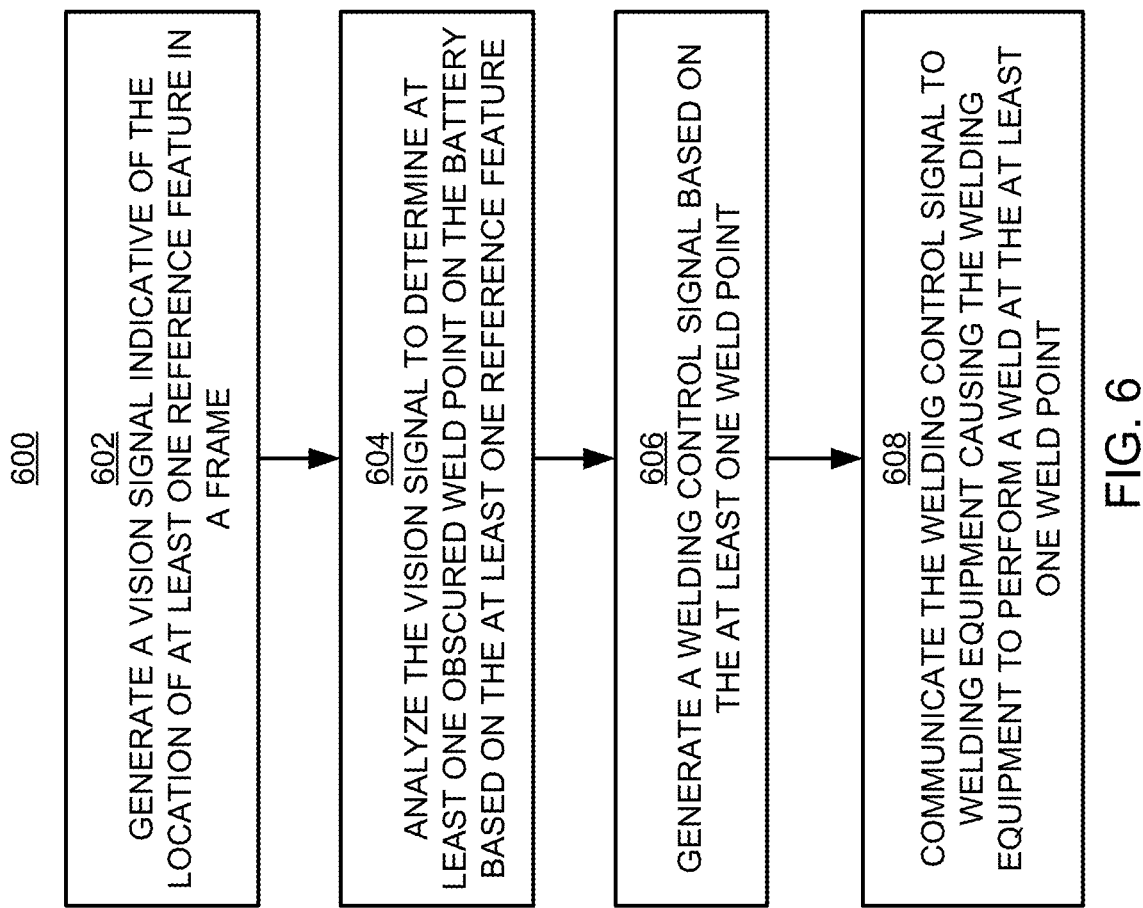
FIG. 6 shows a flowchart of an illustrative process for performing a weld, in accordance with some embodiments of the present disclosure.

FIG. 6 shows a flowchart of illustrative process 600 for performing a weld, in accordance with some embodiments of the present disclosure. Process 600 may be implemented by any suitable control circuitry, which may be included in a mobile computing device, an embedded system, any other suitable computing device, or any combination thereof. For example, the control circuitry may include processing circuitry 504 of FIG. 5, which may implement some or all of process 600.

At step 602, the control circuitry generates a vision signal indicative of the location of at least one reference feature in a frame. In some embodiments, the vision signal is based on one or more vision sensors (e.g., cameras, or photodetectors), which may undergo amplification, filtering, isolation, sampling and digitization, any other suitable signal processing, or any combination thereof. In an illustrative example, an imaging system may be used to collect vision data of the frame and battery cells, with the vision signal being based on the vision data.

At step 604, the control circuitry analyzes the vision signal to determine at least one obscured weld point on the battery based on the at least one reference feature. The imaging system may use edge detection, pattern recognition, or any other suitable analysis technique to analyze the vision signal. The control circuitry may identify one or more features and determine a position, orientation, or both of the one or more features relative to a suitable reference. In some embodiments, for example, the control circuitry may compare a vision signal (e.g., indicative of an image) to one or more templates or references to identify one or more features.

At step 606, the control circuitry generates a welding control signal based on the at least one weld point. In some embodiments, the welding control signal includes an analog signal. For example, a voltage, current, frequency or other suitable characteristic of the welding control signal may indicate one or more welding parameters (e.g., current flow, duration, or other suitable parameter). In some embodiments, the welding control signal includes a digital signal. For example, the welding control signal may include a message, value, set of values, or other suitable information that indicates one or more welding parameters (e.g., current flow, duration, or other suitable parameter).

At step 608, the control circuitry communicates the welding control signal to welding equipment causing the welding equipment to perform a weld at the at least one weld point. The control circuitry may generate and transmit the welding control signal using any suitable communications network (e.g., wired, wireless, or optical) and protocol.

Figure 7:
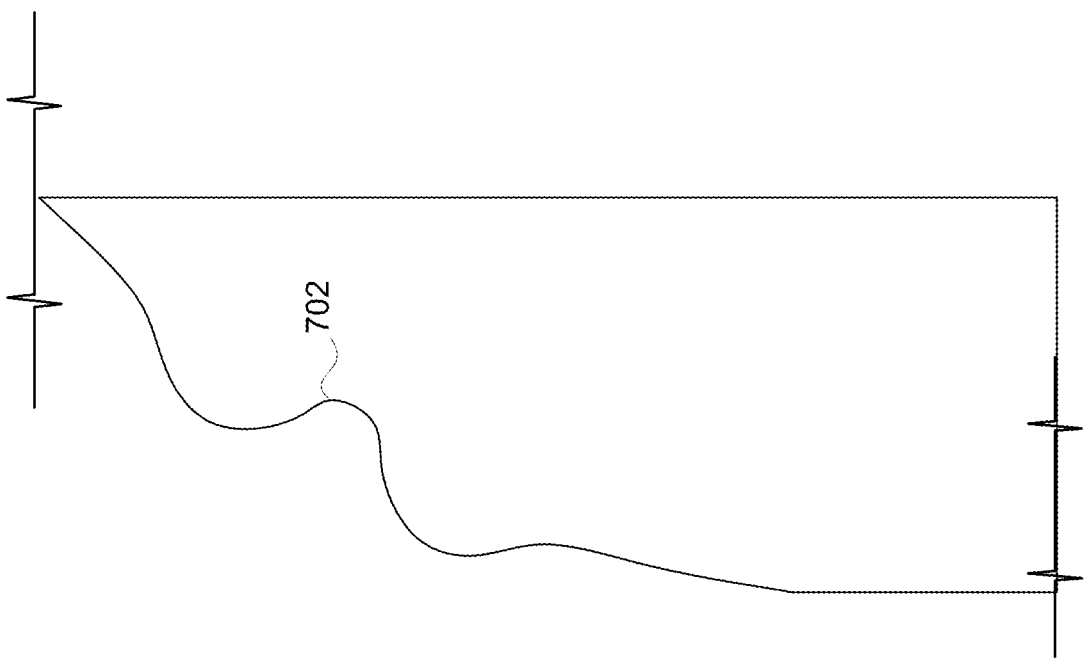
FIG. 7 shows illustrative dimensions and tolerances for crush ribs, in accordance with some embodiments of the present disclosure.

FIG. 7 shows illustrative dimensions and tolerances for crush rib(s) 702 in accordance with some embodiments of the present disclosure. The example illustrated in FIG. 7 includes a nominal wall thickness of 1.1 mm, with a likely range of 1.0-1.2 mm on both sides of a battery cell. Thus, can trade up to about 0.1 mm between crush rib 702 with the out cutout for welding, and crush rib 702 that is continuous. The more room for crush rib 702 to deflect into allows for lower insertion force and assists in maintaining centering of the battery cell. An example range of crush amount may be 0 mm (titangency) to 0.287 mm.

Figure 8:
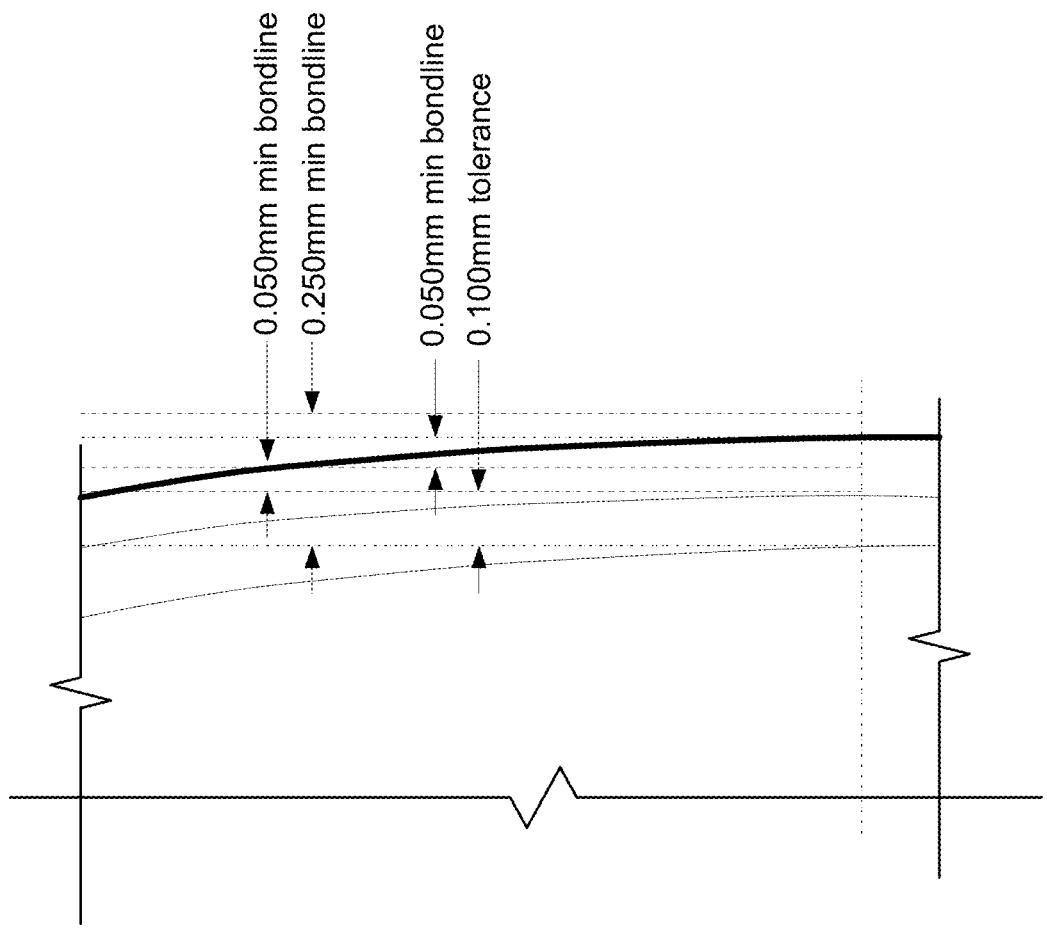
FIG. 8 shows illustrative ranges and tolerances for a bondline, in accordance with some embodiments of the present disclosure.

FIG. 8 shows illustrative ranges and tolerances for a bondline in accordance with some embodiments of the present disclosure. With battery cells tangent against a bottom wall, a bondline of 0.05 mm to 0.25 mm may be maintained.

In some embodiments, the frame of the present disclosure may position multiple batteries, at least one of which is welded in accordance with the present disclosure, and at least one other of which need not be welded at all, or be welded in accordance with any other suitable approach (e.g., because that particular battery is not affected by any obstruction).

It will be understood that the positional descriptions contained herein are subject to some amount of variability and tolerances. For example, reference to a center of a battery cell end face does not necessarily limit the description to a precise center point. Such description is applicable to a point that is within some tolerance of the actual center point. Likewise, discussion of a weld point along a line is made with the understanding that the weld point can be within any suitable tolerance of such line.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A frame comprising:
   a positional reference comprising a pair of stubs wherein:
   a center line defined by the pair of stubs is aligned with a nominal center of a battery arranged within the frame; and
   the center line is interpolated from the pair of stubs and is usable by a vision system to determine at least one weld point corresponding to a location on the battery for welding a component.

2. The frame of claim 1, wherein the positional reference corresponds to a location of respective batteries, the respective batteries arranged adjacent to one another within the frame.

3. The frame of claim 2, wherein the center line of the positional reference is lined up along a center line extending from respective nominal centers of respective end faces of respective batteries.

4. The frame of claim 1, further comprising at least one positional reference feature that respectively engages the battery for positioning the battery in a predetermined position.

5. The frame of claim 4, wherein the at least one positional reference feature comprises at least one crush feature.

6. The frame of claim 4, further comprising a surface for the battery to react against from the positional reference feature.

7. The frame of claim 4, further comprising at least an injection molded portion, wherein the at least one positional reference feature and the positional reference are located in either a core of the injection molded portion or in a cavity of the injection molded portion.

8. The frame of claim 1, wherein the component is an electrode and wherein the battery and the electrode are welded together at the at least one weld point.

9. The frame of claim 1, wherein the battery comprises a cylindrical battery.

10. The frame of claim 1, wherein the pair of stubs interface with a pair of arcs, wherein a center point of each arc is aligned with the nominal center of the battery.

11. A vision system, comprising:
   vision circuitry for generating a vision signal comprising data indicative of a location of a positional reference of a frame, the frame configured to position a battery, the positional reference comprising a pair of stubs, wherein a center line defined by the pair of stubs is aligned with a nominal center of the battery arranged within the frame; and processing circuitry coupled to the vision circuitry and configured to:
  interpolate the center line from the pair of stubs;
  analyze the vision signal to determine at least one weld point on the battery based on the center line, wherein the weld point is obscured to the vision circuitry; and
  generate a welding control signal based on the at least one weld point; and welding equipment coupled to the processing circuitry, wherein the processing circuitry communicates the welding control signal to the welding equipment causing it to perform a weld at the at least one weld point.

12. The vision system of claim 11, wherein the processing circuitry is configured to:
  determine a location of the pair of stubs in the visual signal; and
  interpolate the center line that connects the pair of stubs based on a location of the pair of stubs.

13. The vision system of claim 12, wherein the processing circuitry is further configured to determine the at least one weld point to be along the center line based on a nominal radius of a face of the battery.

14. The vision system of claim 12 wherein the processing circuitry is further configured to:
  locate in the vision signal a point of contact of an outer surface of the battery with a wall of the frame;
  determine a center point of the battery based on the center line and on a distance from the point of contact;
  trace a concentric arc based on the center point, the arc having a predetermined radius based on dimensions of the battery, wherein the arc intersects with the center line; and
  determine the at least one weld point as being along the arc.

15. The vision system of claim 14, wherein the distance is based on a nominal radius of the battery.

16. The vision system of claim 11, wherein the frame is configured to position a second battery, and wherein there is no weld point on the second battery.

17. The vision system of claim 11, wherein the processing circuitry is further configured to:
  determine a location of an arc;
  determine a center point of the arc; and
  determine the at least one weld point based on the center point of the arc.

18. A method for welding one or more weld points of a battery, comprising:
  generating, using processing circuitry, a vision signal comprising data indicative of a location of a positional reference comprising a pair of stubs in a frame configured to position the battery, wherein a center line defined by the pair of stubs is aligned with a nominal center of the battery arranged within the frame;
  interpolating, using the processing circuitry, the center line from the pair of stubs;
  analyzing, using the processing circuitry, the vision signal to determine at least one weld point on the battery based on the center line, wherein the weld point is obscured to vision circuitry;
  generating, using the processing circuitry, a welding control signal based on the at least one weld point; and
  communicating the welding control signal to welding equipment causing the welding equipment to perform a weld at the at least one weld point.

19. The method of claim 18, wherein analyzing the vision signal comprises:
  determining a location of the pair of stubs of the frame in the visual signal;
  interpolating the center line that connects the pair of stubs; and
  determining the weld point based on the center line.

20. The method of claim 18, wherein analyzing the vision signal comprises:
  determining a location of an arc;
  determining a center point of the arc; and
  determining the weld point based on the center point of the arc.

\* \* \* \* \*